United States Patent
Agarwal et al.

(10) Patent No.: US 11,804,969 B2
(45) Date of Patent: Oct. 31, 2023

(54) ESTABLISHING TRUST BETWEEN TWO DEVICES FOR SECURE PEER-TO-PEER COMMUNICATION

(71) Applicant: VMWARE, INC., Palo Alto, CA (US)

(72) Inventors: Avinash Agarwal, Bangalore (IN); Akhil Dhananjaya, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 152 days.

(21) Appl. No.: 17/187,940

(22) Filed: Mar. 1, 2021

(65) Prior Publication Data
US 2022/0231863 A1 Jul. 21, 2022

(30) Foreign Application Priority Data
Jan. 15, 2021 (IN) .............................. 202141002010

(51) Int. Cl.
*H04L 9/32* (2006.01)
*H04L 9/08* (2006.01)
(Continued)

(52) U.S. Cl.
CPC .......... *H04L 9/3263* (2013.01); *H04L 9/0822* (2013.01); *H04L 9/30* (2013.01);
(Continued)

(58) Field of Classification Search
CPC . H04L 9/0819; H04L 9/0822; H04L 9/08253; H04L 9/3236; H04L 9/3247; H04L 9/3263; H04L 63/0823
See application file for complete search history.

(56) References Cited

U.S. PATENT DOCUMENTS

| | | | |
|---|---|---|---|
| 6,772,341 B1 * | 8/2004 | Shrader | G06F 21/64 380/28 |
| 11,411,816 B1 * | 8/2022 | Saluja | H04L 41/0806 |

(Continued)

OTHER PUBLICATIONS

Schneier, Bruce "Applied Cryptography: Protocols, Algorithms and Source Code in C" [Online], 2015 [Retrieved on: Sep. 11, 2022], EBSCOhost, pp. 22,58-66,184-189, Retrieved from: < https://search.ebscohost.com/login.aspx?direct=true&db=nlebk&AN=1535854&site=ehost-live&scope=site > (Year: 2015).*

*Primary Examiner* — Eric W Shepperd
(74) *Attorney, Agent, or Firm* — Clayton, McKay & Bailey, PC

(57) ABSTRACT

Systems and methods are described for establishing trust between two devices for secure peer-to-peer communication. In an example, a first and a second device can each possess a digital signature issued by the same certificate authority and a hash function issued by the same trusted entity. The devices can exchange public keys that include their respective digital signatures. The second device can verify the first device's digital signature, encrypt an encryption key with the second device's public key, hash the encryption key using its hash function, and encrypt the hash using its private key. The second device can send the encrypted hash and encryption key to the first device. The first device can verify the second device's digital signature, decrypt the encryption key, and decrypt the encrypted hash. The first device can hash the encryption key using its hashing function and compare the two hashes to verify the second device.

17 Claims, 4 Drawing Sheets

(51) Int. Cl.
*H04L 9/30* (2006.01)
*H04L 9/40* (2022.01)

(52) U.S. Cl.
CPC .......... *H04L 9/3236* (2013.01); *H04L 9/3247* (2013.01); *H04L 63/0823* (2013.01)

(56) References Cited

U.S. PATENT DOCUMENTS

| | | | |
|---|---|---|---|
| 2002/0191783 A1* | 12/2002 | Takahashi | H04L 9/0643 380/28 |
| 2010/0211795 A1* | 8/2010 | Brown | H04L 9/3263 380/278 |
| 2011/0276806 A1* | 11/2011 | Casper | G06F 21/78 713/189 |
| 2016/0011990 A1* | 1/2016 | Berengoltz | G06F 21/6218 711/152 |
| 2016/0173488 A1* | 6/2016 | Xie | H04L 9/3263 713/156 |
| 2018/0013547 A1* | 1/2018 | Giura | H04L 63/1408 |
| 2018/0145971 A1* | 5/2018 | Mistry | H04L 63/0823 |
| 2020/0195642 A1* | 6/2020 | Liderman | H04L 9/321 |
| 2020/0351260 A1* | 11/2020 | White | G06F 21/445 |

* cited by examiner

ESTABLISHING TRUST BETWEEN TWO DEVICES FOR SECURE PEER-TO-PEER COMMUNICATION

RELATED APPLICATIONS

Benefit is claimed under 35 U.S.C. 119(a)-(d) to Foreign Application Serial No. 202141002010 filed in India entitled "ESTABLISHING TRUST BETWEEN TWO DEVICES FOR SECURE PEER-TO-PEER COMMUNICATION", on Jan. 15, 2021, by VMware, Inc., which is herein incorporated in its entirety by reference for all purposes.

BACKGROUND

Enterprise organizations today are almost universally dependent on computer systems for day-to-day operations. Most employees have one or more devices assigned to them that they use to operate within the enterprise environment and perform their jobs. For example, employees use computing devices to receive mail and messages, send documents and other files to other employees, and to access computer applications necessary to perform certain tasks.

Enterprises typically require various forms of cyber security to ward off would-be hackers attempting to infiltrate their systems. Sometimes even a simple piece of malware on one user device in an enterprise system can be enough to give an unauthorized person access to enterprise data. To combat this, enterprises often implement a Unified Endpoint Management ("UEM") system that allows the enterprise to enforce security and compliance settings on the user devices. A management application on the user device communicates with a management server in the UEM system to verify that the user device is secure before allowing the user device to access enterprise data and resources. Even when an employee wants to send data from one user device to another, this typically requires a UEM server to act as a middleman in verifying that both devices are secure.

However, a UEM server may not always be available to facilitate device-to-device communications and verify the security of the user devices involved. For example, the UEM server can go down or the employee can be at a remote location without access to the UEM server. Also, enterprises may desire to let user devices establish trust without needing to communicate with a UEM server to preserve computing resources. For example, enterprises may desire to let user devices establish trust and exchange data over a peer-to-peer ("P2P") network. To prevent a hacker from accessing data in an exchange during transmission, user devices can use various encryption methods. However, encryptions cannot prevent one of the devices from harming the other if they connect for a data transfer. There currently is no way for the user devices involved in the data exchange to know whether the other is a trusted device without using a server.

As a result, a need exists for establishing trust between two devices for secure P2P communication.

SUMMARY

Examples described herein include systems and methods for establishing trust between two devices for secure P2P communication. In an example, two user devices can each include an encryption key pair received from a management server. The key pairs can each include a private key and a public key, and the public keys can include a digital signature from the same certificate authority. The user devices can also possess a hashing function. The hashing function can be received by each user device from the same trusted source before the user devices attempt to establish trust with each other.

In an example, a first of the two user devices ("user device A") can receive a request from the second of the two user devices ("user device B") to exchange data over a P2P network. The user devices A and B can exchange public keys from their key pairs. The user devices A and B can also verify that the public key received from the other device is digitally signed by the correct certificate authority. In one example, the certificate authority can be an internal entity of an organization that only digitally signs keys for user devices that are enrolled with the organization.

In an example, the user device B can create an encryption key that can later be used to exchange data. The user device B can encrypt the encryption key using the public key it received from the user device A. The user device B can also hash the encryption key using the hash function it received from the trusted source. The user device B can also encrypt the hash using its private key. In one example, the encryption on the hash can be a digital signature of the user device B. This can result in the user device B possessing both an encrypted encryption key and an encrypted hash of the encryption key. The user device B send the encrypted encryption key and an encrypted hash of the encryption key to the user device A.

In an example, upon receiving the encrypted encryption key and an encrypted hash of the encryption key, the user device A can decrypt the encrypted hash to get a hash of the encryption key, the encryption key having been hashed with the hash function at the user device B. The user device A can also decrypt the encrypted encryption key using the private key of the user device A. The user device A can then hash the encryption key using its own hash function. This can result in the user device A possessing two versions of the encryption key: one hashed with the hash function from the user device A, and one hashed with the hash function from the user device B.

In an example, the user device A can compare the two hashed encryption keys to determine whether they match. If the two hashes match, then the two user devices have established trust because no tampering has happened. In an instance where the hashes match, the user device A notify the user device B. The user device B can then begin exchanging data. In one example, the exchanged data can be encrypted using the encryption key.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for establishing trust between two user devices for secure peer-to-peer communication. In an example, a first and a second user device can both be in possession of a digital signature issued by the same certificate authority and a hash function issued by the same trusted entity. The second user device can send a data transfer request to the first user device. The two user devices can exchange public keys that include their respective digital signatures. The second user device can verify the second user device's digital signature, encrypt an encryption key with the second user device's public key, hash the encryption key using the hash function, and encrypt the hash using the second user device's private key. The second user device can send the encrypted hash and encryption key to the first user device. The first user device can verify the second user device's digital signature, decrypt the encryption key using its private key, and decrypt the encrypted hash with the second user device's public key. The first user device can hash the decrypted encryption key using its hashing function and compare the two hashes to verify trust with the second user device.

Figure 1:
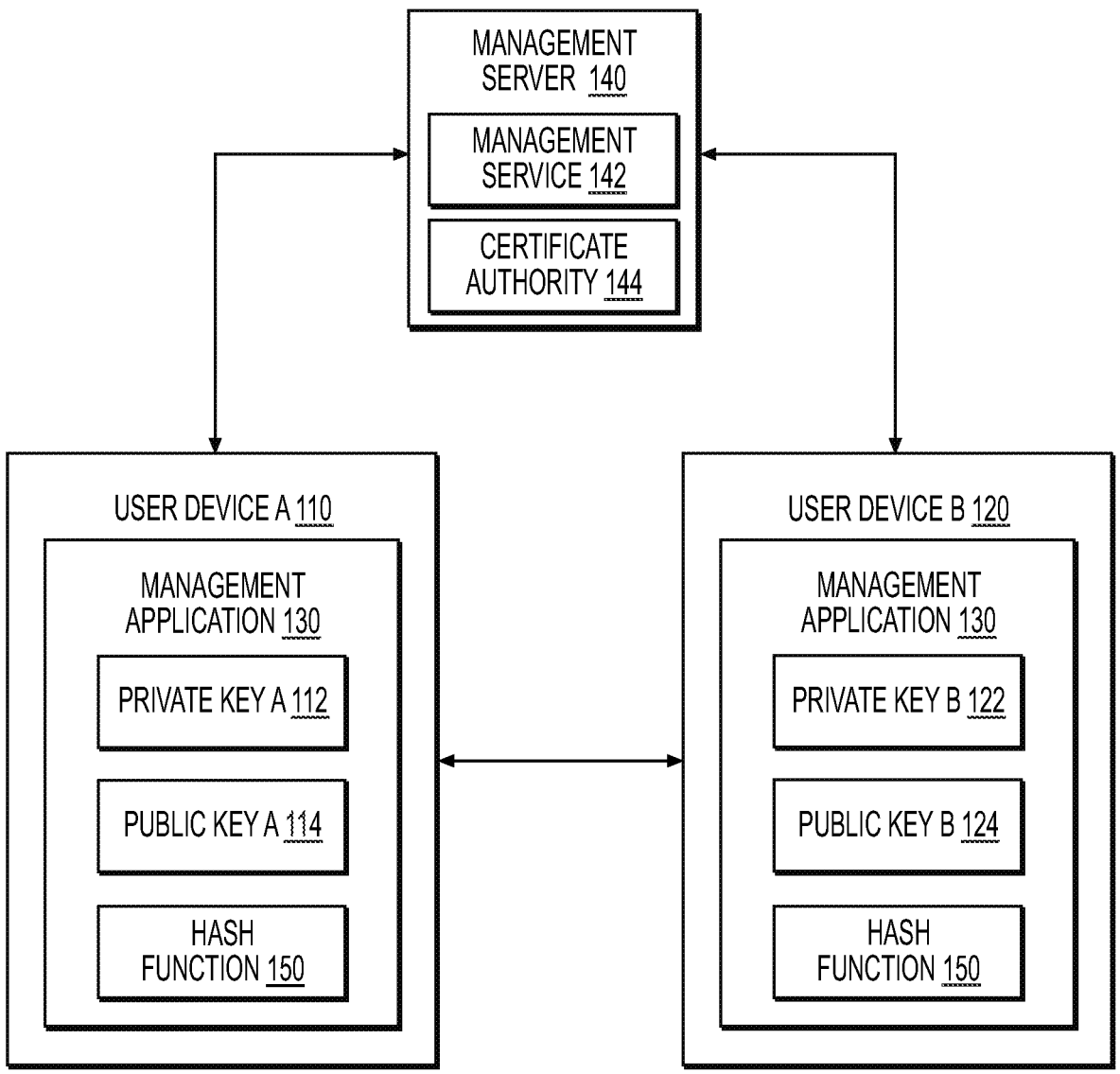
FIG. 1 is an illustration of an example system for establishing trust between two user devices for secure P2P communication.
Figure 2:
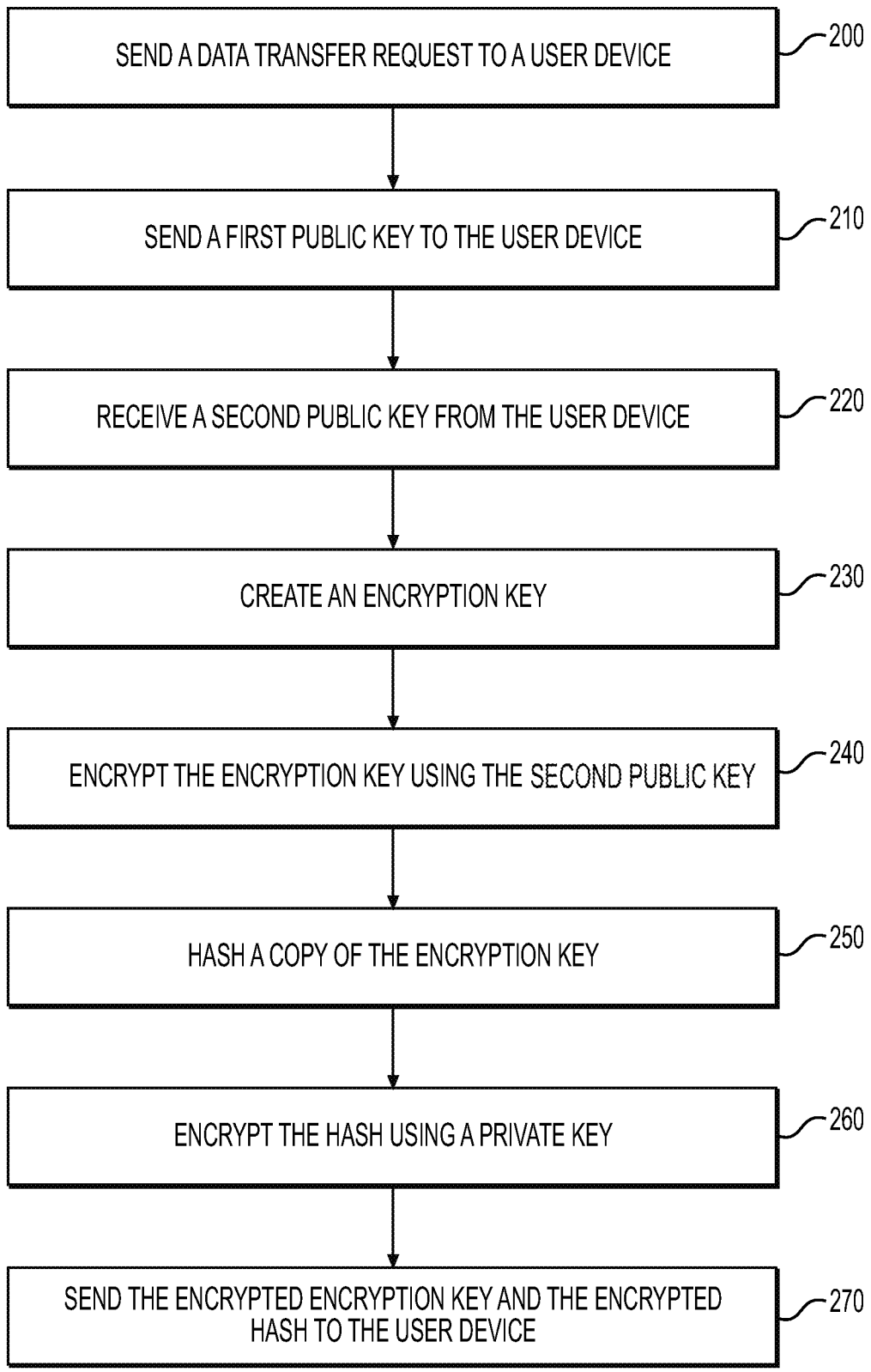
FIG. 2 is a flowchart of an example method for establishing trust between two user devices for secure P2P communication.
Figure 3:
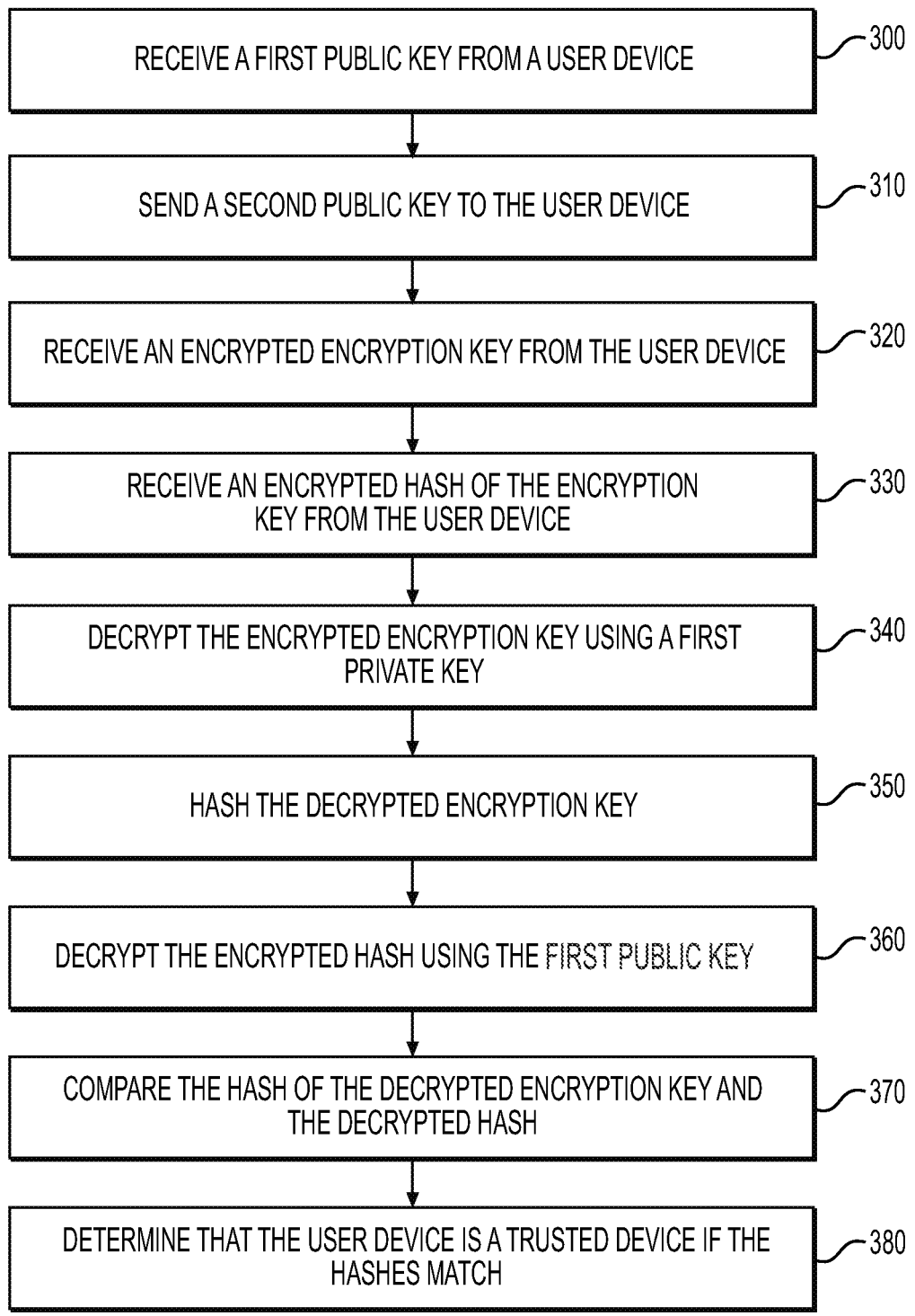
FIG. 3 is another flowchart of an example method for establishing trust between two user devices for secure P2P communication.
Figure 4:
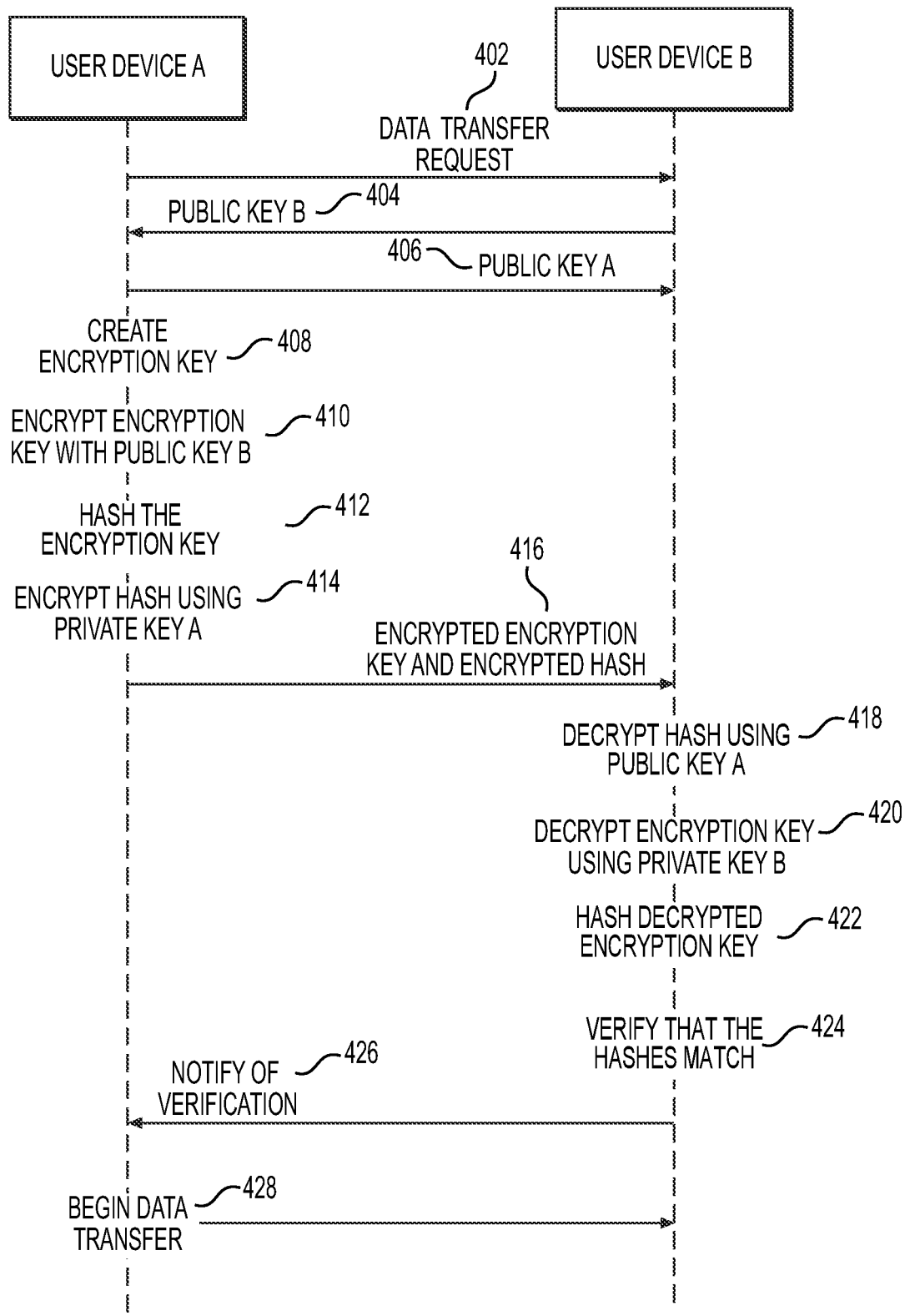
FIG. 4 is a sequence diagram of an example method for establishing trust between two user devices for secure P2P communication.

FIG. 1 illustrates an example system for establishing trust between two user devices for secure P2P communication. FIGS. 2 and 3 illustrate example methods for establishing trust between two user devices for secure P2P communication. FIG. 2 illustrates an example method from the perspective of a user device requesting the P2P communication. FIG. 3 illustrates an example method from the perspective of a user device receiving the P2P communication request. FIG. 4 is a sequence diagram of an example method for establishing trust between two user devices for secure P2P communication that includes stages performed by both user devices.

FIG. 1 is an illustration of an example system for establishing trust between two user devices for secure P2P communication. The system can include a user device A 110 and a user device B 120. The user devices A 110 and B 120 can be one or more processor-based devices, such as a personal computer, tablet, or cell phone. The user devices A 110 and B 120 can include a management application 130. The management application 130 can be a stand-alone application, part of an enterprise application, or part of an operating system of the user devices A 110 and B 120. The management application 130 can be part of an enterprise Unified Endpoint Management UEM system that manages and secures user devices that are enrolled with the enterprise. For example, the management application 130 can be responsible for ensuring that user devices are up to date with compliance and security settings prior to accessing enterprise data and resources. The management application 130 can communicate with a management service 142 on a management server 140, allowing UEM management of user devices A 110 and B 120 based on compliance and security settings at the management server 130. The management application 130 can enforce compliance at the user devices A 110 and B 120, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

The management server 140 can be a single server or a group of servers, including multiple servers implemented virtually across multiple computing platforms. In an example, the management server 140 can be part of a UEM system. The management service 142 can communicate with the management application 130 to manage user devices A 110 and B 120. For example, the management service 142 can send compliance and security updates to the management application 130 and ensure that the management application 130 verifies the compliance and security settings of the user devices A 110 and B 120 before allowing access to enterprise data and resources. By enforcing compliance and security settings, the management application 130 can ensure that sensitive data is protected when accessed on the user device 110, 120. Similarly, the management application 130 can ensure that data is properly encrypted and protected when transferring the data between devices 110, 120.

In one example, the management service 140 can handle user device enrollment with a UEM system. For example, when a user enrolls a user device with the UEM system, the management service 140 can verify credentials and provide the security and compliance settings for the management application 130 to enforce at the enrolling device. In one example, part of the enrollment process can include providing security keys to the enrolling device. For example, the private key A 112 and public key A 114 can be security keys provided to the user device A 110, and the private key B 122 and public key B 124 can be security keys provided to the user device B 120. In one example, the security keys can be stored and managed in the management application 130. In another example, the security keys can be stored and managed in a separate application managed by the management application 130. The management application 130 can be installed on the user devices 110, 120 as part of the enrollment process, in an example.

In one example, the public security keys A 112 and B 122 can be digitally signed by a certificate authority 144. The certificate authority 144 can be an entity that issues digital certificates to validate identifies and bind them to cryptographic key pairs. Although the certificate authority 144 is illustrated as being part of the management server 140, the certificate authority 144 can also be a separate entity, such as a different server or group of servers in a UEM system. In one example, the certificate authority 144 can be located within a UEM system so that it only signs security keys for enrolled user devices. This can ensure that only devices enrolled with the UEM system have security keys signed with a digital signature from the certificate authority 144. In an instance where the user devices A 110 and B 120 exchange public keys, this can verify that the user device sending the public key is enrolled in the UEM.

In an example, when a user device enrolls in the UEM, the management server 140 can also provide a hash function 150. The hash function 150 can be a mathematical algorithm that maps a numerical value to another compressed value. In one example, the hash function 150 can be a cryptographic hash function that maps arbitrary data to a bit array of fixed size. In an example, the hash functions 150 on user devices A 110 and B 120 can be the same hash function. For example, the hash function 150 can be provided from the management server 140 as part of an enrollment process with a UEM system, or at a time thereafter. In an example, the management server 140 can provide the same hash function 150 to user devices that are authorized to exchange data with each other over a P2P network. In one example, the management server 140 can provide the same hash function 150 to all user devices enrolled in the UEM. In another example, the management server 140 can provide different hash functions 150 that correspond to groups within an enterprise organization that the user device belongs. For example, devices 110, 120 can belong to users that are in an executive group. The hash function can be the same for devices in the executive group, but different compared to the hash function for a developer group. When two devices 110, 120 have received the same hash function, they can communicate with one another as described below without further server contact, in an example. This can aid in allowing the user devices A 110 and B 120 to verify that both are enrolled in the UEM system and can trust each other. This trust can be established using the methods described below.

FIG. 2 is a flowchart of an example method for establishing trust between two user devices for secure P2P communication. The example method illustrated in FIG. 2 can include steps performed by the user device A 110 when establishing trust between the user device A 110 and the user device B 120. At stage 200, the user device A 110 can send a data transfer request to the user device B 120. In one example, user device A 110 can send the request over a P2P network. The P2P network can be BLUETOOTH, WIFI, an Internet connection without using a central server, or some other device-to-device connection. In one example, the user device A 110 can query the management server 140 for a network address for connecting to the user device B 120 over a P2P network. In another example, the user device A 110 can have the network address for the user device B 120 already stored. For example, the user devices A 110 and B 120 can be enrolled with a UEM system. The devices 110, 120 can be assigned to different users in the UEM system, in an example. Alternatively, the devices 110,120 can be assigned to a single user with the same user profile in an example. The UEM system can be configured to distribute P2P network addresses for all user devices enrolled under a single user profile to each other. In one example, user devices in the UEM system can be grouped by other methods for P2P file sharing, such as by organization or geolocation. Alternatively, devices can detect each other through BLUETOOTH or other localized transmissions by the management application 130 or a separate file sharing application, in an example.

In an example, the user device A 110 can send the request using a file sharing application. Both the user devices A 110 and B 120 can include the file sharing application, and the user device A 110 can send the request using an application programming interface ("API") call. In one example, the file sharing application can be managed by the management application 130. Alternatively, the management application 130 can be the file sharing application.

At stage 210, the user device A 110 can send the public key A 114 to the user device B 120. In an example, the public key A 114 can be a public security key that includes a cryptographic algorithm for encrypting files that can only be decrypted with the private key A 112. In an example, the public key A 114 can include a digital certificate. The digital certificate that can be an electronic document that proves that the user device A 110 is the owner of the public key A 114. In one example, the digital certificate can include a digital signature issued by the certificate authority 144.

At stage 220, the user device A 110 can receive the public key B 124 from the user device B 120. In an example, the public key B 124 can be a public security key that includes a cryptographic algorithm for encrypting files that can only be decrypted with the private key B 122. In an example, the public key B 124 can include a digital certificate that verifies the user device B 120 as its owner. In one example, the digital certificate included with the public key B 124 can include a digital signature issued by the certificate authority 144.

In an example, user device A 110 can verify the public key B 124. In one example, this can be done using the digital certificate of the public key B 124. For example, the user device A 110 can verify that the certificate authority 144 issued the digital certificate. To do this, in one example, the user device A 110 can compare the digital certificate of the public key B 124 to the public key A 114 to verify that they have the same digital certificate authority. In an example where the certificate authority 144 is an internal service that is part of a UEM system, the digital certificate verification can confirm that the user device B 120 is also enrolled in the same UEM system. Otherwise, the device B 120 would not have access to the certificate authority 144 that issues the certificate.

At stage 230, the user device A 110 can create an encryption key. The encryption key can be any kind of encryption cipher for exchanging encrypted data. As an example, the encryption key can be an Advanced Encryption Standard ("AES") key. The encryption key can be created for purposes of sharing data between the devices 110, 120, such that even if transmissions are intercepted the data itself will be encrypted.

At stage 240, the user device A 110 can encrypt the encryption key using the public key B 124. By using the public key B 124, the user device B 120 becomes the only device that can decrypt the encryption key because the user device B 120 is the only device that has the private key B 122.

At stage 250, the user device A 110 can hash the encryption key. In an example, the user device A 110 can use the hash function 150, which can be provided by the management server 140. For example, the hash function 150 can be provided as part of the enrollment process of user devices. In another example, a user device can register for P2P transfers to receive the hash function 150. In one example, the management server 140 can provide the same hash function 150 to the user devices A 110 and B 120. This can allow the user device B 120 to verify the hash function 150 of the user device A 110 as a step in verifying the user device A 110, which is described in more detail regarding FIG. 3 below.

At stage 260, the user device A 110 can encrypt the hash using the private key A 112. In an example, the encrypted hash can serve as a digital signature that verifies that to the user device B 120 that the encrypted hash came from the user device A 110 and was not altered during transit. For example, if the user device B 120 can decrypt the encrypted hash using the public key A 114 sent by the user device A 110 at stage 210, then the user device B 120 can know that the hash was encrypted using the private key A 112.

At stage 270, the user device A 110 can send the encrypted encryption key and the encrypted hash to the user device B 120. In an example, user device B 120 can then use the encrypted encryption key and the encrypted hash to verify the user device A 110 using the method described in FIG. 3 below.

In an example of the above-described method, the user device A 110 can be enrolled in a UEM system. As part of the enrollment process, the certificate authority 144 can provide a digital signature for the public key B 124 and the management server 140 can provide the hash function 150. Sometime after enrollment, the user device A 110 can send a P2P data exchange request to the user device B 120. The user device A 110 can also send the public key A 114 to the user device B with its corresponding digital signature. The user device A 110 can receive the public key B 124 from the user device B and its corresponding digital signature. The user device A 110 can verify that the digital signature was issued by the certificate authority 144. The user device A 110 can then generate an encryption key and encrypt it using the public key B 124. The user device A 110 can also hash the encryption key using the hash function 150 and encrypt the hash using the private key A 112. The user device A 110 can then send both the encrypted encryption key and the encrypted hash to the user device B 120. The user device B 120 can decrypt the encryption key using the private key B 122 and hash it using the hashing function 150 it has stored. The user device B 120 can also decrypt the encrypted hash from the user device A 110 using the public key A 114. The user device B 120 can notify the user device A 110 if trust can be established. If so, the user device A 110 can begin a data exchange with the user device B 120 using the encryption key to encrypt the data.

If a nefarious actor were to intercept any of the exchanges between the user devices A 110 and B 120, the actor would not have the tools necessary to ascertain the encryption key or tamper with the exchanges. For example, the encryption key sent from the user device A 110 to the user device B 120 at stage 270 is encrypted with the public key B 124. The encryption key can therefore only be decrypted using the private key B 122, which only the user device B 120 possesses. If the nefarious actor intercepts the encrypted hash of the encryption key, the encryption key would still be protected because the nefarious actor would not be in possession of the hash function 150. Even if the actor intercepted the public key A 112 and decrypted the hash with it, the actor still could not access the encryption key because of the hash. Using the methods described herein, the user devices A 110 and B 120 can therefore establish trust with each other and securely exchange an encryption key that can be used for a data exchange.

FIG. 3 is another flowchart of an example method for establishing trust between two user devices for secure P2P communication. The example method illustrated in FIG. 3 can include steps performed by the user device B 120 when establishing trust between the user device A 110 and the user device B 120. At stage 300, the user device B 120 can receive the public key A 114 from the user device A 110. In an example, the public key A 114 can be received as part of, or along with, a data transfer request from the user device A 110. In one example, the public key A 114 can be received over a P2P network. For example, the user device A 110 and the user device B 120 can include a file sharing application that facilitates file sharing over P2P networks. In one example, such a file sharing application can be the management application 130.

In one example, the user device B 120 can verify the public key A 114. For example, the user device B 120 can verify that the certificate authority 144 issued the digital certificate. In one example, the user device B 120 can compare the digital certificate of the public key A 114 to the public key B 124 to verify that they have the same digital certificate authority. In an example where the certificate authority 144 is an internal service that is part of a UEM system, the digital certificate verification can confirm that the user device A 110 is also enrolled in the same UEM system.

At stage 310, the user device B 120 can send the public key B 124 to the user device A 110. In an example, the user device B 120 can send the public key B 124 in response to receiving a data transfer request from the user device A 110. In one example, the public key B 124 can be sent as a data file over a P2P network.

At stage 320, the user device B 120 can receive an encrypted encryption key from the user device A 110. The encryption key can be an encryption cipher for exchanging encrypted data, such as an AES key. The encryption key can be a key that was created and encrypted at the user device A 110. In one example, the encryption key can be encrypted with the public key B 124 that the user device B 120 sent to the user device A 110 at stage 310. For example, the user device B 120 can send the public key B 124 to the user device A 110, the user device A 110 can create and encrypt an encryption key with the public key B 124, and then the user device A 110 can send the encrypted encryption key to the user device B 120.

At stage 330, the user device B 120 can receive an encrypted hash of the encryption key from the user device A 110. For example, the user device A 110 can hash the encryption key using the hash function 150 and encrypt it using the private key A 112. The user device A 110 can then send the encrypted hash of the encryption key to the user device B 120.

At stage 340, the user device B 120 can decrypt the encrypted encryption key using the private key B 122. For example, the encrypted encryption key can be encrypted with the public key B 124 that the user device B 120 sent to the user device A 110 at stage 310. This can allow the user device B 120 to decrypt the encryption key with the private key B 122.

At stage 350, the user device B 120 can hash the decrypted encryption key. In an example, the user device B 120 can hash the decrypted encryption key using the hash function 150. In one example, the hash function 150 can be provided by the management server 140. For example, the hash function 150 can be provided as part of the enrollment process of user devices. In another example, a user device can register with the management server 140 for P2P transfers to receive the hash function 150. In one example, the management server 140 can provide the same hash function 150 to the user devices A 110 and B 120. The user device A 110 can use the hash function 150 to hash the encryption key that it encrypted using the public key B 124. This can allow the user device B 120 to verify the hash function 150 of the user device A 110 as a step in verifying the user device A 110, which is described in more detail below.

At stage 360, the user device B 120 can decrypt the encrypted hash using the public key A 114. For example, the encrypted hash received at stage 330 can be encrypted with the private key A 112. The encryption on the hash can serve as a digital signature that verifies that to the user device B 120 that the encrypted hash came from the user device A 110 and was not altered during transit.

At stage 370, the user device B 120 can compare the hash of the decrypted encryption key and the decrypted hash. For example, hashing the encryption key at stage 350 can leave the user device B 120 with an encryption key that has been hashed using the hash function 150. Additionally, decrypting the encrypted hash at stage 360 can also leave the user device B 120 with an encryption key that has been hashed using the hash function 150. The user device B 120 can compare the hashes to determine whether they match.

At stage 380, the user device B 120 can determine whether the user device A 110 is a trusted device based on whether the hashes match. For example, if the hashes match, the user device B 120 can determine that the user device A 110 is a trusted device. Matching hashes can indicate that all the encryptions and decryptions occurred properly and that both devices possess the same hashing function 150 that was provided by the management server 140. If the hashes do not match, then the user device B 120 can determine that the user device A 110 is not a trusted device. In an example, the user device B 120 can also notify the user device A 110 when the verification is successful, and the user device A 110 can begin a P2P data transfer.

In an example of the method described above, the user device B 120 can be enrolled in a UEM system. As part of the enrollment process, the certificate authority 144 can provide a digital signature for the public key B 124 and the management server 140 can provide the hash function 150. Sometime after enrollment, the user device B 120 can receive a P2P data exchange request from the user device A 110. The user device B 120 can also receive the public key A 112 from the user device A 110, which can include a digital signature. The user device B 120 can verify that the digital signature was issued by the certificate authority 144 and send the public key B 124 the user device A 110. The user device B 120 can then receive an encrypted encryption key and an encrypted hash of the encrypted key from the user device A 110. The encryption key can be encrypted with the public key B 124 and the hash of the encryption key can be encrypted with the private key A 112. The user device B 120 can decrypt the encryption key using the private key B 122 and hash it using the hash function 150. The user device B 120 can also decrypt the hash received from the user device A 110 using the public key A 114. The user device B 120 can compare the decrypted hash to its own hash of the encryption key and determine that the two hashes match. This means that both the user devices A 110 and B 120 hashed the encryption key using the same hash function 150 that is only available to user devices enrolled with the UEM. The user device B 120 can notify the user device A 110 that trust has been established, and the user devices A 110 and B 120 can begin exchanging data using the encryption key to encrypt the data.

The methods described above regarding FIGS. 2 and 3 include multiple layers of verification for establishing trust between devices. For example, the user devices A 110 and B 120 exchange public keys A 112 and B 124, which can both include a digital certificate from an internal certificate authority 144. This can verify to each device that the other is enrolled in the same organization. Both user device A 110 and B 120 also include the hashing function 150 that was previously provided by the management server 140. The user devices A 110 and B 120 both hash the encryption key using the hashing function 150. The management server 140 can be configured to issue the hashing function 150 only to enrolled devices, which can serve as another verification layer in establishing trust. Furthermore, the methods above describe encrypting and decrypting the encryption key and hashes using encryption keys provided by the user devices A 110 and B 120, which provides a layer of security that verifies the identify of each device and that the exchanged keys and hashes were not tampered with during transmission.

FIG. 4 is a sequence diagram of an example method for establishing trust between two user devices for secure P2P communication. The sequence diagram in FIG. 4 illustrates stages performed by two user devices, the user devices A 110 and B 120. In an example, the user devices A 110 and B 120 can both be managed by a common organization, such as a UEM system. For example, prior to performing the stages described below the user devices A 110 and B 120 can both enroll with a UEM system, which the method can leverage to establish trust. In an example, as part of the enrollment process, or at a time thereafter, the certificate authority 144 can provide a certificate for P2P communication to both user devices A 110 and B 120. In an example, both user devices A 110 and B 120 can receive the hash function 150 from the UEM system. For example, the hash function 150 can be provided as part of the enrollment process, or at a time thereafter, from the management server 140. Both user devices A 110 and B 120 can therefore both possess both a digital signature issued from a verified certificate authority and a hash function issued from a trusted entity prior to performing the stages described below.

In one example, the UEM system can distribute hash functions based on groups. A user device 110, 120 can belong to one or more of these groups, in an example. The stages described for verifying hashes match can include checking all hashes that are received from the UEM system, in an example. In this way, if the UEM system can grouped devices together, then data transmission between them without server interaction may be possible.

In the example methods of FIGS. 2 and 3 described above, the user device A 110 can encrypt an encryption key using the public key B 124 and encrypt the hash of the encryption key using the private key A 112. The user device B 120 can then decrypt the encryption key using the private key B 122 and decrypt the hash using the public key A 114. However, in some examples the encryption keys used can be switched. For example, the user device A 110 can use the private key A 112 to encrypt the encryption key, which can then be decrypted by the user device B 120 using the public key A 124. Also, the user device A 110 can use the public key B 124 to encrypt the hash of the encryption key, which can then be decrypted by the user device B 120 using the private key B 122.

At stage 402, the user device A 110 can send a data transfer request to the user device B 120. In one example, user device A 110 can send the request over a P2P network. The request can be sent using a file sharing application on the user device A 110. For example, the user devices A 110 and B 120 can include a file sharing application that is configured to facilitate P2P data exchanges between user devices, and a user can initiate a data transfer request using the application.

At stage 404, the user device B 120 can send the public key B 124 to the user device A 110. In an example, the public key B 124 can also include a digital certificate issued by the certificate authority 144. The user device A 110 can also verify the digital certificate to verify that the user device B 120 is enrolled in the UEM system.

At stage 406, the user device A 110 can send the public key A 114 to the user device B 120. In an example, the public key A 114 can include a digital certificate issued by the certificate authority 144. The user device B 120 can verify the digital certificate to determine that the public key A 114 comes from a device enrolled in the same organization. For example, the certificate authority 144 can issue digital certificates only to devices enrolled in a UEM system, so verifying the digital certificate of the public key A 114 can verify to the user device B 120 that the user device A 110 is enrolled in the same UEM.

At stage 408, the user device A 110 can create an encryption key. The encryption key can be an encryption cipher for exchanging encrypted data, such as an AES key.

At stage 410, the user device A 110 can encrypt the encryption key with the public key B 124. By using the public key B 124, the user device B 120 can become the only device that can decrypt the encryption key because the user device B 120 is the only device that has the private key B 122.

At stage 412, the user device A 110 hash the encryption key. In an example, the user device A 110 can hash the encryption key using the hash function 150. In one example, the hash function 150 can be provided to enrolled user devices by the management server 140. In another example, the management server 140 can provide different hash functions for different groups within an organization. This can be used to restrict which user devices in an organization can establish trust with each other. For example, management level user devices can receive a unique hash function so that they can establish trust with other management level user devices. However, non-management level user devices can be given a different hash function so that they can establish trust with each other, but not with management level user devices. In one example, a user device can be given multiple hash functions that correspond to various groups within the organization to which the user device belongs.

At stage 414, the user device A 110 can encrypt the hash using the private key A 112. In an example, the encrypted hash can serve as a digital signature that verifies to the user device B 120 that the encrypted hash came from the user device A 110 and was not altered during transit. At stage 416, the user device A 110 send the encrypted encryption key and the encrypted hash to the user device B 120.

At stage 418, the user device B 120 can decrypt the encrypted hash using the public key A 114. For example, the private key A 112 and the public key A 114 can be an encrypted key pair. Because the hash was encrypted using the private key A 112 from the user device A 110, the user device B 120 can use the public key A 114 that it received at stage 404 to decrypt hash. By decrypting the hash, the user device B 120 possesses the encryption key hashed by a hashing function on the user device A 110.

At stage 420, the user device B 120 can decrypt the encryption key using the private key B 122. For example, the private key B 122 and the public key B 124 can be an encrypted key pair. Because the encryption key was encrypted using the public key B 124 that the user device B 120 send to the user device A 11 at stage 406, the user device B 120 can use the private key B 122 to decrypt encryption key.

At stage 422, the user device B 120 can hash the decrypted encryption key. In an example, the user device B 120 can hash the encryption key using the hash function 150. The hash function 150 can be a hash function that the user device B 120 received when enrolling with an organization, such as a UEM system.

At stage 424, the user device B 120 can verify that the hashes match. The user device B 120 can determine that the user device A 110 is a trusted device where the hashes match. For example, the encryptions can help verify to the user device B 120 that the encrypted encryption key and encrypted hash of the encryption in fact came from the user device A 110 and that they were not altered in transit. Also, where the hashes match, that can verify to the user device B 120 that both the user devices A 110 and B 120 possess the hash function 150, which was previously received from a trusted source, the management server 140. In one example, matching hashes can also verify that the user devices A 110 and B 120 both belong to a group within an organization that is permitted to exchange data content over a P2P network.

At stage 426, the user device B 120 can notify the user device A 110 that the verification was successful. For example, the user device B 120 can send an encrypted data file, such as a JavaScript Object Notation ("JSON") or Extensible Markup Language ("XML") file, indicating that the user device B 120 has approved the user device A 110 as a trusted device.

At stage 428, the user device A 110 can begin transferring data to the user device B 120. In one example, the data transfer can occur over a P2P network. The user device A 110 can encrypt the data using the encryption key. The user device B 120, having received and decrypted the encryption key at stages 416 and 420, can decrypt the data using the same encryption key.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for establishing trust between a first user device and a second user device, comprising:

sending, from the first user device to the second device, a first public key;

receiving, from the second device, a second public key;

verifying that the first and second public keys are signed by at least one certificate authority that is part of a Unified Endpoint Management ("UEM") system to which the first and second user devices are both enrolled;

receiving, from the second device, an encrypted encryption key, the encryption key having been encrypted with the first public key;

decrypting, by the first user device, the encrypted encryption key using a first private key;

hashing the decrypted encryption key by using a hash function that is assigned to a first organizational group to which both the first and second user devices belong, wherein multiple organizational groups are defined in the UEM system for a single organization, a plurality of the organizational groups being assigned different hash functions for use in hashing the decrypted encryption key;

receiving, from the second device, an encrypted hash of the encryption key, the encrypted hash having been encrypted with a second private key;

decrypting the encrypted hash using the second public key;

comparing the hash of the decrypted encryption key and the decrypted hash; and in an instance where the hash of the decrypted encryption key matches the decrypted hash, determining that the second device is a trusted device.

2. The method of claim 1, wherein the first public key includes a first digital signature, and the second public key includes a second digital signature.

3. The method of claim 2, further comprising verifying the second digital signature based on the first and second digital signatures both having the same certificate authority.

4. The method of claim 1, wherein the hash function is provided by a trusted entity.

5. The method of claim 4, wherein the first user device is sent multiple hash functions that correspond to a plurality of organizational groups within the organization to which the first user device belongs.

6. The method of claim 1, wherein
the first public key is paired to the first private key,
the second public key is paired to the second private key,
the first private key is stored on the first user device, and
the second private key is stored on the second user device.

7. A non-transitory, computer-readable medium containing instructions that, when executed by a hardware-based processor, performs stages for establishing trust between a first user device and a second user device, the stages comprising:

sending, from the first user device to the second device, a first public key;

receiving, from the second device, a second public key;

verifying that the first and second public keys are signed by a certificate authority is part of a Unified Endpoint Management system to which the first and second user devices are both enrolled;

receiving, from the second device, an encrypted encryption key, the encryption key having been encrypted with the first public key;

decrypting, by the first user device, the encrypted encryption key using a first private key;

hashing the decrypted encryption key by using a hash function that is assigned to a first organizational group to which both the first and second user devices belong wherein multiple organizational groups are defined in the UEM system for a single organization, each of the organizational groups being assigned different hash functions for use in hashing the decrypted encryption key;

receiving, from the second device, an encrypted hash of the encryption key, the encrypted hash having been encrypted with a second private key;

decrypting the encrypted hash using the second public key;

comparing the hash of the decrypted encryption key and the decrypted hash; and in an instance where the hash of the decrypted encryption key matches the decrypted hash, determining that the second device is a trusted device.

8. The non-transitory, computer-readable medium of claim 7, wherein the first public key includes a first digital signature, and the second public key includes a second digital signature.

9. The non-transitory, computer-readable medium of claim 8, the stages further comprising verifying the second digital signature based on the first and second digital signatures both having the same certificate authority.

10. The non-transitory, computer-readable medium of claim 7, wherein the hash function for hashing the decrypted encryption key is provided by a trusted entity.

11. The non-transitory, computer-readable medium of claim 10, wherein the first user device is sent multiple hash functions that correspond to a plurality of organizational groups within the organization to which the first user device belongs.

12. The non-transitory, computer-readable medium of claim 7, wherein
the first public key is paired to the first private key,
the second public key is paired to the second private key,
the first private key is stored on the first user device, and
the second private key is stored on the second user device.

13. A system for establishing trust between a first user device and a second user device, comprising:

a memory storage including a non-transitory, computer-readable medium comprising instructions; and a computing device including a hardware-based processor that executes the instructions to carry out stages comprising:

sending, from the first user device to the second device, a first public key;

receiving, from the second device, a second public key;

verifying that the first and second public keys are signed by at least one certificate authority that is part of a Unified Endpoint Management system to which the first and second user devices are both enrolled;

receiving, from the second device, an encrypted encryption key, the encryption key having been encrypted with the first public key;

decrypting, by the first user device, the encrypted encryption key using a first private key;

hashing the decrypted encryption key based on a hash function that is assigned to a first organizational group to which both the first and second user devices belong, wherein multiple organizational groups are defined in the UEM system for a single organization, a plurality of the organizational groups being assigned different hash functions for use in hashing the decrypted encryption key;

receiving, from the second device, an encrypted hash of the encryption key, the encrypted hash having been encrypted with a second private key;

decrypting the encrypted hash using the second public key;

comparing the hash of the decrypted encryption key and the decrypted hash; and in an instance where the hash of the decrypted encryption key matches the decrypted hash, determining that the second device is a trusted device.

14. The system of claim 13, wherein the first public key includes a first digital signature, and the second public key includes a second digital signature.

15. The system of claim 14, the stages further comprising verifying the second digital signature based on the first and second digital signatures both having the same certificate authority.

16. The system of claim 15, wherein the hash function for hashing the decrypted encryption key is provided by a trusted entity.

17. The system of claim 16, wherein the first user device is sent multiple hash functions that correspond to a plurality of organizational groups within the organization to which the first user device belongs.

* * * * *